Oct. 22, 1957     L. B. SEBRELL     2,810,129
METHOD OF MAKING A HOLLOW ARTICLE FROM RUBBER
SHEETING AND ARTICLE MADE THEREBY
Filed April 1, 1953

*INVENTOR.*
LORIN B. SEBRELL
BY
ATTORNEY

United States Patent Office 2,810,129
Patented Oct. 22, 1957

2,810,129

METHOD OF MAKING A HOLLOW ARTICLE FROM RUBBER SHEETING AND ARTICLE MADE THEREBY

Lorin B. Sebrell, Dover, Del., assignor to International Latex Corporation, Dover, Del., a corporation of Delaware Application April 1, 1953, Serial No. 346,105

3 Claims. (Cl. 2—37)

My invention relates to a method of making a hollow article from rubber sheeting and more particularly to the method of securing two edges of the rubber sheet together.

Hitherto such seams have been formed by cementing the edges together and covering the seam by an adhering strip. This is used where the walls of the article are not subject to considerable strain as in a rubber raincoat. However, where the article is subject to pulling or distortion, such as takes place in a girdle, a cemented seam is unsatisfactory, especially if the natural elasticity of the rubber is employed to control the contours of the female body.

Girdles made from sheet rubber have been made by stitching the rubber parts into the desired form. Rubber itself however has unsatisfactory tear resistance and once a tear has started it propagates very rapidly. No particular reason is generally known for this characteristic and care in the manufacture of all rubber articles subject to pull is required to prevent nicking the edges which will start a tear at the nick.

Hitherto tear resistance has been accomplished by using fine particle size reinforcing pigments such as certain kinds of carbon black, or fine particle size calcium silicate. In addition, the rubber has been backed with a tear resistant material such as a suitable fabric, and, where necessary, fabric inserts have been incorporated in the rubber.

The problem becomes acute when it is desired to use sheet material cut into parts and fitted into a particular shape usually in the form of a hollow body. The edges are difficult to cut cleanly and to keep clear of nicks. When the rubber is sewn, the needle actually tears out a minute piece of rubber from the stitch wall and the thread is drawn through the resulting torn hole. A hole so formed by rupture of the rubber is a source of nicks from which a propagating tear may originate.

Accordingly it is an important object of my invention to provide a method of stitching rubber parts together in a manner which will reduce the number of tears that originate from the stitched seam, to provide such seam which does not unduly thicken the seam so as to make it objectionable when worn over the body, and to accomplish the foregoing in a method which lends itself to mass production and at reasonable cost.

These and other objects are accomplished and new results obtained as will be apparent from the devices described in the following description, particularly pointed out in the claims, and illustrated in the accompanying drawings, in which:

Figure 1:
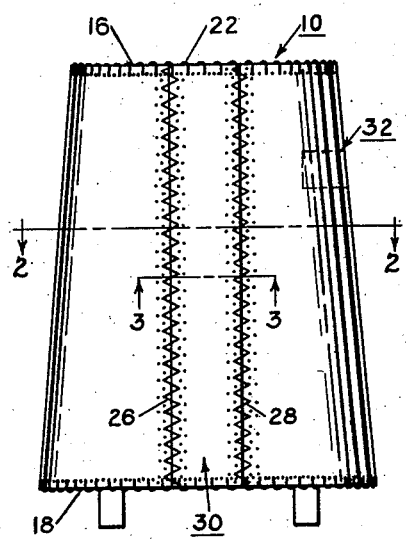
Fig. 1 is a side elevation of a girdle made by my process.
Figure 2:
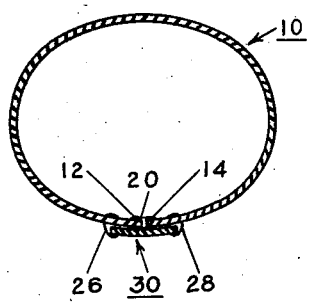
Fig. 2 is a cross-section of the same.
Figure 3:
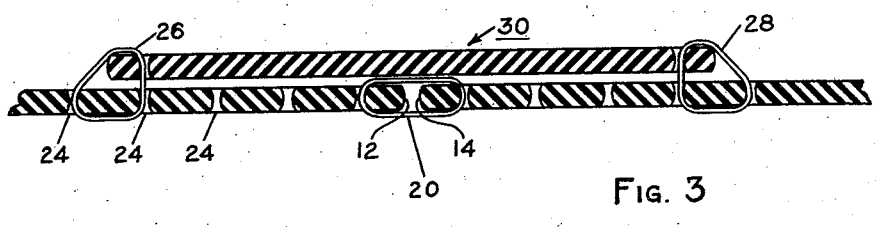
Fig. 3 is a partial, greatly enlarged sectioned view taken in the plane 3—3 of Fig. 2.

I have discovered that if the rubber can be provided in the stitched area with small holes ranging in size from 0.001 to 0.050 inch or even more, which holes are formed during deposition of wet rubber latex and before drying and curing, that such holes, when the deposited latex is dried and vulcanized, resist tearing by threads to a much larger degree than sheared holes punched in the vulcanized rubber. The holes should be spaced apart a distance sufficient to permit a sewing needle, if it does not enter a hole on a particular stroke, to engage the rubber somewhere near the rim of the hole. I have found that the rubber holes, having rounded shoulders will adjust themselves to the needle so that the needle will, with surprising frequency, enter or register in a hole so made and so dimensioned. The greater number of holes on the line of stitching, the greater the degree of self registration.

For example, a latex rubber sheet of about 0.040 thickness, having specially formed holes of about 0.012 inch in diameter, and spaced apart so that 900 holes can be accommodated in a square inch, will accommodate the needle to perform the requisite stitching with great uniformity. Should a needle miss a hole and cause a rupture, the adjacent hole in the direction of the pull will cause the thread to reseat itself on an unruptured surface.

The holes should be provided throughout the zone of stitching, and, if it be desired to keep the impermeable character of the seam, a rubber cement or other suitable elastic material may be used to cover both the stitched and unused holes. Such a cement will additionally be useful to reduce the unit pressures of the thread under tension, and further aid in preventing tearing.

If holes in the rubber sheeting are not objectionable and, in fact, are desirable as, for instance, when used for a girdle to permit the perspiration to evaporate, the entire sheet from which the parts are cut may be perforate as described. A girdle so made may be stitched anywhere on the body, as for instance on the principal seam, or on the margins, as is illustrated in the drawing, Fig. 1, where the girdle 10 is provided with two abutting edges 12 and 14, which extend longitudinally from the upper edge 16 to the lower edge 18.

A zig-zag stitch 20 locks the two edges 12 and 14, while an encircling edge stitch 22 may be provided as a reinforcement. In Fig. 1, the section 3—3 is taken through the longitudinal seam, along which a zone of the special holes are formed as indicated by holes 24. Zig-zag stitching may be employed to lock the two edge portions 12 and 14 in position under a reinforced strip 30 of the same rubber as is used to make the girdle body.

Figure 4:
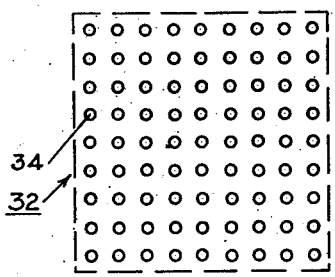
Fig. 4 is a greatly enlarged plan view of the overall surface of a modified form of the sheet material.

In Fig. 4 a representative area of the girdle body is illustrated, designated as 32, indicated in enlarged form the hole spacing which may be provided throughout the girdle body as well as in the stitching zone to obtain the benefits of the holes for ventilation purposes. Each hole 34 is suitably spaced from its adjacent hole to provide the size and spacing previously described.

The perforated material may be used to provide greater garter tabs 36 for attaching suitable fastening means thereto.

Various methods may be used to produce the material suitable for my stitching articles. For example, a latex compound of suitable viscosity may be applied over a plate having desirable patterned concavities of suitable depth. The viscosity of the latex prevents it from entering the concavities, thereby entrapping air in each concavity so that the entrapped air, upon heating, blows and forms a hole in the wet latex. The operation may be continued with intermediate drying, until the desired film thickness is obtained. Upon vulcanization, the hole required for my stitched article is completed.

Other suitable methods may be employed.

Among the many articles that may be formed by my process are brassieres and girdles.

The foregoing aperture so produced and suitably spaced and sized permits stitching to be made in any part of the sheet material with an increased resistance to tear so as to make practical a girdle entirely made of sheet rubber except for the stitching.

Should any stitch be pulled through the spacing between holes, further propagation of the tear will be restricted if not entirely avoided.

The seams thus made are exceptionally strong and do not require fabric inserts or backing which may thicken the seam objectionably.

I have thus described my invention, but I desire it to be understood that it is not confined to the particular forms or uses shown and described, the same being merely illustrative, and that the invention may be carried out in other ways without departing from the spirit of my invention, and, therefore, I claim broadly the right to employ all equivalent instrumentalities coming within the scope of the appended claims, and by means of which objects of my invention are attained and new results accomplished, as it is obvious that the particular embodiments herein shown and described are only some of the many that can be employed to attain these objects and accomplish these results.

I claim:

1. The method of making a stitched article of rubber, which comprises forming a sheet of rubber in the wet state; forming a multiplicity of holes in said wet rubber in close proximity to each other; drying and curing the same; shaping said rubber sheet into a hollow article with the preformed holes overlapping; stitching said overlapped portion to form a seam with a length of stitch substantially greater than the spacing between holes.

2. An article made in accordance with claim 1, comprising homogeneous sheet rubber formed into the shape of a hollow body having a stitched seam, said sheet rubber being provided with a plurality of uncut holes, the inner surfaces of which possess the same tear resistant surface characteristics as the two flat surfaces of the sheet rubber, said uncut holes being in close proximity to one another in the area of the seam and spaced apart a distance substantially less than the length of the individual stitches forming the stitched seam and extending entirely throughout the stitching area forming a substantially greater number of holes in the length of the stitching area than stitches, causing the stitching to enter a substantial number of the uncut holes.

3. The article of claim 1, wherein the preformed holes are distributed substantially uniformly throughout the sheet material.

References Cited in the file of this patent
UNITED STATES PATENTS

| | | |
|---|---|---|
| 1,499,265 | Ullman et al. | June 24, 1924 |
| 1,958,207 | Scheibel et al. | May 8, 1934 |
| 1,960,803 | Baumer | May 29, 1934 |
| 2,084,593 | Pickens | June 22, 1937 |
| 2,365,016 | Spanel | Dec. 12, 1944 |
| 2,428,127 | Sidnell | Sept. 30, 1947 |
| 2,686,311 | Rosenberg | Aug. 11, 1954 |